(12) United States Patent
Jarlengrip

(10) Patent No.: US 7,411,485 B2
(45) Date of Patent: Aug. 12, 2008

(54) APPARATUS AND METHOD FOR ALTERING A DRIVER WHEN A VEHICLE DEPARTS FROM A PREDEFINED DRIVING AREA IN A LANE

(75) Inventor: Johan Jarlengrip, Göteborg (SE)

(73) Assignee: Volvo Lastvagnar AB, Gothenburg (SE)

( * ) Notice: Subject to any disclaimer, the term of this patent is extended or adjusted under 35 U.S.C. 154(b) by 392 days.

(21) Appl. No.: 11/163,005

(22) Filed: Sep. 30, 2005

(65) Prior Publication Data

US 2006/0220904 A1    Oct. 5, 2006

Related U.S. Application Data

(63) Continuation of application No. PCT/SE2004/000365, filed on Mar. 12, 2004.

(30) Foreign Application Priority Data

Mar. 31, 2003    (SE)    .................... 0300920

(51) Int. Cl.
G08G 1/16    (2006.01)
B60Q 1/00    (2006.01)
(52) U.S. Cl. ............... 340/435; 340/436; 340/438; 701/301
(58) Field of Classification Search ............... 340/435, 340/436, 438, 439, 575, 576, 901, 903; 701/301
See application file for complete search history.

(56) References Cited

U.S. PATENT DOCUMENTS

| 5,519,536 | A | * | 5/1996 | Hoehn | ............... 359/630 |
|---|---|---|---|---|---|
| 5,642,093 | A | * | 6/1997 | Kinoshita et al. | ........... 340/439 |
| 5,699,057 | A | * | 12/1997 | Ikeda et al. | ................. 340/937 |
| 6,107,939 | A | * | 8/2000 | Sorden | ........................ 340/901 |
| 6,411,901 | B1 | * | 6/2002 | Hiwatashi et al. | ........... 701/301 |
| 7,227,454 | B2 | * | 6/2007 | Braeuchle et al. | ........... 340/435 |
| 2002/0011925 | A1 | | 1/2002 | Hahn | |
| 2003/0052773 | A1 | * | 3/2003 | Sjonell | ....................... 340/435 |
| 2003/0128106 | A1 | * | 7/2003 | Ross | ............................. 340/435 |

FOREIGN PATENT DOCUMENTS

| EP | 1017036 A1 | 5/2000 |
|---|---|---|
| EP | 1235052 A1 | 8/2002 |
| JP | 11126300 | 11/1999 |
| JP | 2001-341599 | 11/2001 |
| WO | 04-088611 A1 | 10/2004 |

OTHER PUBLICATIONS

International Search Report dated Jun. 16, 2004 from the International Application PCT/SE2004/000365.

* cited by examiner

*Primary Examiner*—Jeff Hofsass
*Assistant Examiner*—Anne V. Lai
(74) *Attorney, Agent, or Firm*—Novak Druce + Quigg LLP

(57) ABSTRACT

Method and apparatus (2) of a vehicle for alerting a driver of a vehicle when the vehicle deviates from a predefined driving area in a lane. The apparatus includes an image display unit (6) and a control unit (5) connected to each other to enable the apparatus to provide a visual warning via the image display unit when the vehicle is outside the predefined driving area and where the visual warning is displayed in the form of a solid or broken line on the side of the image display unit (6) that corresponds to the side of the vehicle where the deviation occurs.

23 Claims, 3 Drawing Sheets

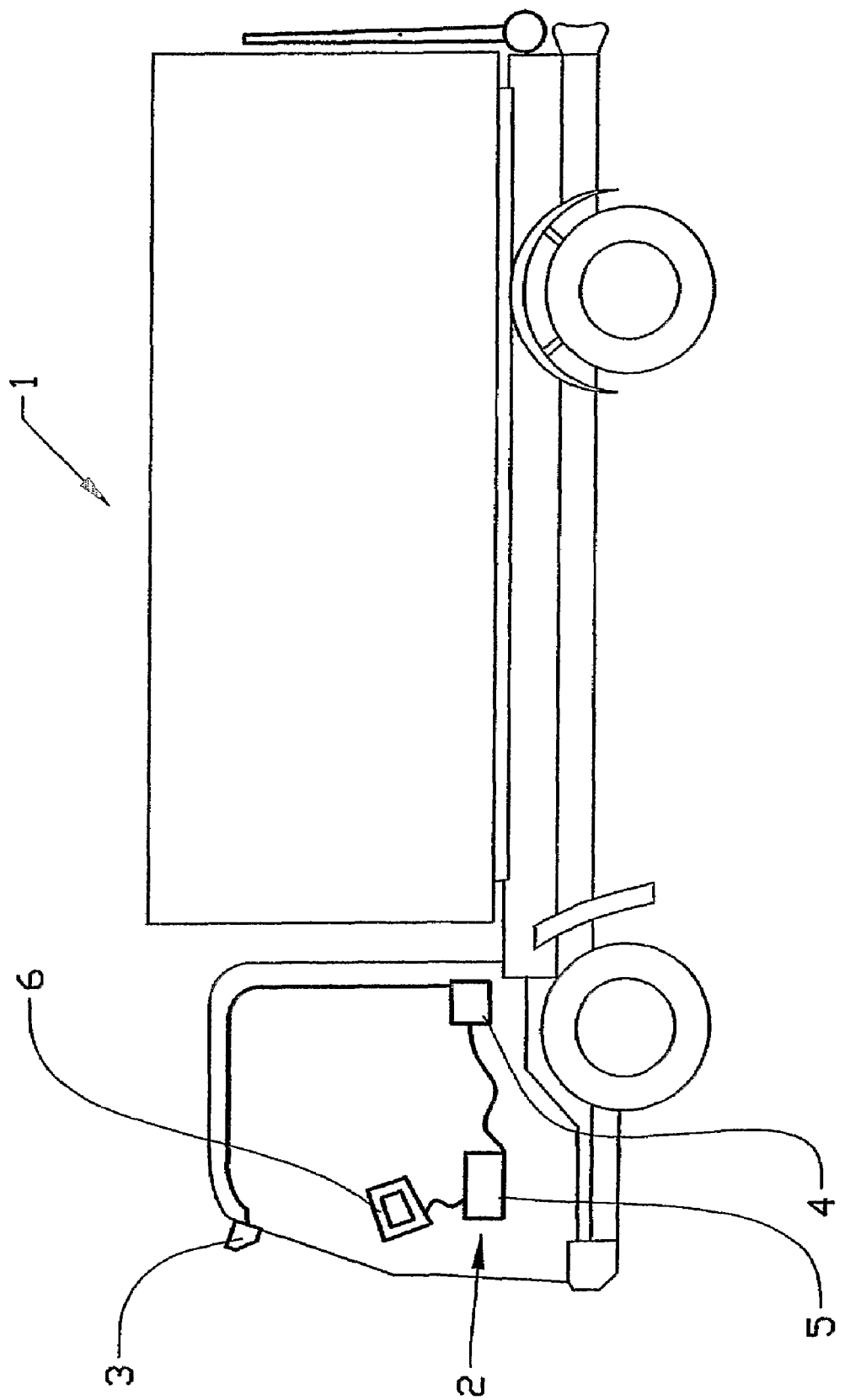

APPARATUS AND METHOD FOR ALTERING A DRIVER WHEN A VEHICLE DEPARTS FROM A PREDEFINED DRIVING AREA IN A LANE

CROSS-REFERENCE TO RELATED APPLICATIONS

The present application is a continuation patent application of International Application No. PCT/SE2004/000365 filed 12 Mar. 2004 which was published in English pursuant to Article 21(2) of the Patent Cooperation Treaty, and which claims priority to Swedish Application No. 0300920-6 filed 31 Mar. 2003. Said applications are expressly incorporated herein by reference in their entireties.

TECHNICAL FIELD

The present intervention relates to an apparatus and a method for alerting a driver when the vehicle is driven outside a predefined driving area in an effort to prevent the vehicle from unintentionally departing from a lane.

BACKGROUND OF THE INVENTION

Many modern vehicles are equipped with some form of information display located either among the vehicle's instruments or in the vehicle's dashboard. A large quantity of information can be displayed, for example information about the operating condition of the vehicle, telephone numbers and navigation aids. It can happen that the driver is distracted by the information on the display and as a result looses concentration on the road. There are, in addition, several other devices in the modern vehicle that distract the driver, for example telephone and audio equipment. This can lead to the vehicle coming close to or crossing over one of the road's lane lines, for example, the centerlines and side lines of the road.

Even if the vehicle's deviation is small, this can disturb the drivers of other vehicles in the surrounding area. In the event of large deviations and/or deviations of longer duration, there is a risk that there may be an accident with serious consequences if, for example, the driver has fallen asleep.

There are known systems that alert the driver when he or she approaches or crosses over a lane line. Some systems also indicate in which direction the deviation occurs.

The use of one or more lamps to alert the driver is already known. Such a system shows warning lights from the side toward which the deviation occurs. If the deviation is large, several lamps can light or the intensity of the light can be increased. There are also systems where a lamp flashes and where the flashing frequency increases when the deviation increases.

JP 11126300 describes a method in which the system alerts the driver via a loudspeaker. The system alerts the driver by means of an audible signal from the side toward which the deviation occurs. For example, a warning sound is emitted from the right loudspeaker if the vehicle is too far toward the right. The intensity of the sound increases as the deviation increases. In addition, an image of a vehicle is shown on a display, with the color of the vehicle changing depending upon the size of the deviation.

EP 1235052 and JP 2001341599 describe systems that alert the driver by means of vibration at the driver's seat when the vehicle unintentionally changes lane.

These methods can work in most cases, but they have certain disadvantages.

One disadvantage is that lamps and audible signals must be modified to suit the surroundings. For example, a quiet audible warning system is not noticed if the driver is playing loud music or if the traffic noise is loud, while at the same time an audible warning signal must not be so loud that the driver is disturbed if it is quiet in the cab. The same applies for lamps that must be easily visible even if the driver views them against the light, while at the same time the lamps must not disturb the driver, for example when he is driving at night.

When the warning signals are given by means of lamps, it is also necessary to have an extra installation with lamps and cabling which is unnecessarily expensive.

Another disadvantage is that it is difficult to provide information about the size of the deviation, by means of lamps, audible signals or vibrations, that is easy to understand. As flashing frequency, light brightness, sound level, sound frequency and the like are relative concepts, it is difficult for a driver to interpret the size of the deviation. In many cases, the driver only perceives that the deviation is small or large.

Another disadvantage with certain known systems is that the warning signal is not simple and clear, and as a result, there can be a danger that the driver will miss the warning.

SUMMARY OF THE INVENTION

An object of the invention is therefore to achieve an apparatus which gives a visual warning in a simple and clear way when the vehicle deviates from a predefined driving area in a lane and to provide a method for alerting a driver in a simple and clear way when the vehicle deviates from a predefined driving area in a lane.

One exemplary apparatus configured according to the invention includes an image display unit and a control unit that are connected to each other. The apparatus functions to give a visual warning via the image display unit when the vehicle is outside the predefined driving area, with the visual warning being displayed in the form of a solid or broken line on the side of the image display unit that corresponds to the side of the vehicle where the deviation occurs.

An exemplary method conducted according to the invention includes detecting the limits of the lane and identifying the position of the vehicle in the lane. The position of the vehicle is compared with the driving area and when the vehicle is outside the predefined driving area, a visual warning is given, via an image display unit, in the form of a solid or broken line on the side of the display that corresponds to the side of the vehicle where the deviation occurs.

In this configuration, the apparatus provides the driver with a visual warning when the vehicle is driven within a predefined distance from a lane line. The advantage of this apparatus is that a driver of the vehicle receives information in a simple and intuitive way to the effect that the vehicle is too close, for example, to the side of the road.

In an advantageous variation or development of this embodiment of the invention, the visual warning is moved sideways in proportion to the size of the deviation; the advantage being that the driver also receives information about the size of the deviation.

In a further development, the visual warning is moved lengthways in proportion to the speed of vehicle. The advantage of this is that it is easier for a driver to perceive the warning.

In yet a further development, an acoustic signal and/or a vibration signal is also used to alert the driver. The advantage of this is that the warning can be made even clearer, for example when the deviation is large.

In still a further development, the apparatus is deactivated when an intentional change of lane is carried out, for example when the vehicle's indicators are activated. The advantage of this is that the driver is not alerted unnecessarily.

In another development, the driving area of the apparatus is modified to suit the type of road on which the vehicle is being driven. The advantage of this is that the driver is not alerted unnecessarily, while, at the same time, the apparatus can alert the driver when this is required.

In yet a further development, the apparatus is activated and/or the parameters of the apparatus are modified when there is a risk that the driver may lose concentration or when the driver has actually lost concentration. The object of this is to avoid alerting the driver unnecessarily.

In still a further development, the apparatus is deactivated in the event of an external occurrence, when the vehicle is driven below a predefined speed and/or when the vehicle is within a predefined geographical area. The object of this is to avoid alerting the driver unnecessarily.

In another development, the apparatus acts upon the vehicle's steering mechanism when the vehicle is driven on or near a lane line. The object of this is to prevent the vehicle crossing over a lane line when, for example, the driver has fallen asleep.

A method performed according to the invention for alerting a driver of a vehicle when the vehicle deviates from the predefined driving area in a lane comprises the steps of comparing the position of the vehicle with a predefined driving area and, when the vehicle is outside the predefined driving area, of giving a visual warning in the form of a solid or broken line on the side of the driver that corresponds to the vehicle's deviation. The advantage of this method is that a driver receives a simple and intuitive warning that the vehicle is too close to a line.

In an advantageous first further development of the method according to the invention, the position of the warning mark is proportional to the vehicle's distance to the edge of the driving lane. The advantage of this is that the driver also receives information about the size of the deviation.

In an advantageous second further development of the method according to the invention, the warning mark is moved along the longitudinal axis of the vehicle in proportion to the vehicle's speed. The advantage of this is that the warning is clearer.

In an advantageous third further development of the method according to the invention, the visual warning is deactivated in the event of a predefined external occurrence. The advantage of this is that it avoids alerting the driver unnecessarily.

In an advantageous fourth further development of the method according to the invention, the method also alerts the driver by means of an audible signal and/or a vibration signal when the vehicle is outside the predefined driving area. The advantage of this is that a warning can be intensified when the deviation is large.

In an advantageous fifth further development of the method according to the invention, the parameters of the apparatus are activated and/or modified in the event of a predefined occurrence. The advantage of this is that it can be ensured that the warning is only given when it is actually needed.

In an advantageous sixth further development of the method according to the invention, the driving area is modified to suit the type of road on which the vehicle is being driven. The advantage of this is that it avoids alerting the driver unnecessarily.

BRIEF DESCRIPTION OF THE DRAWINGS

The invention will be described in greater detail in the following, with reference to embodiments that are illustrated in the accompanying drawings, in which:

FIG. 1 schematically shows an apparatus configured according to the invention and mounted on a heavy truck (lorry);

FIGS. 2b and 3b show a vehicle's position on the road in relation to the warning marks depicted in FIGS. 2a and 3a.

DETAILED DESCRIPTION

Figure 2B:
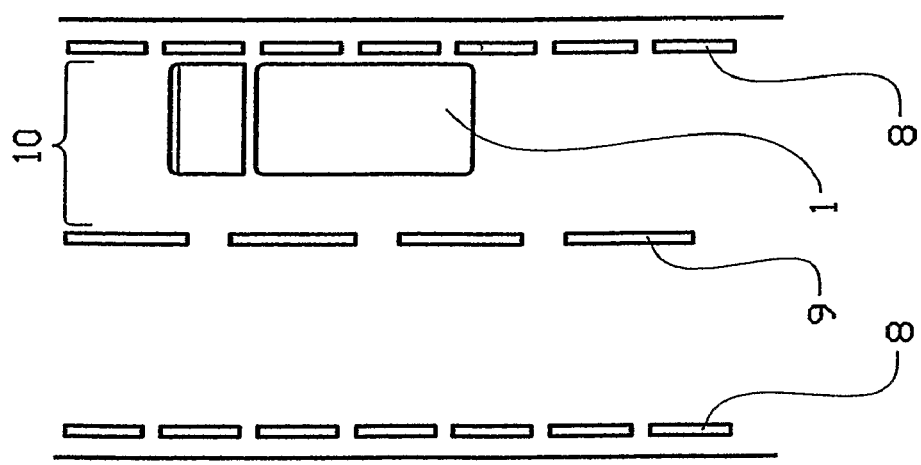

The embodiments of the invention, including the several variations described in the following, are only to be regarded as examples of the invention(s), and are in no way intended to be limitations on the patent claims.

FIG. 1 schematically shows an apparatus 2 configured according to the invention for alerting a driver in the event of a deviation from a predefined driving area in a lane. The apparatus 2 is conventionally mounted on a vehicle 1. A camera 3 is mounted on the front part of the vehicle in such a way that its image area covers an area in front of the vehicle. The camera 3 is used to reproduce an image of the road in front of the vehicle.

Alternatively, several cameras can be used, for example a camera can be mounted on each rear-view mirror. The signal is sent to a control unit 4 that analyses the image in a known way in order to identify the lane, for example in order to identify lane lines such as the center line and the line at the side of the road. If there are no lane lines, the control unit 4 can also detect the side of the road by, for example, comparing the difference between the road surface and the area outside the road surface. Different types of camera and detection methods are considered to be known to experts in the field and are therefore not dealt with in greater detail.

The control unit 4 can also detect the position of the vehicle in the lane. This can be carried out due to the position of the camera and the vehicle's dimensions being known. In this way, the control unit can calculate the distance between the vehicle and the lane lines. The distance between the vehicle and the lane lines is to be understood as the distance between the outer sides of the vehicle and the lane lines. Another way of calculating the position of the vehicle in the lane is also to include the vehicle in the image. As the position of the camera is known, the control unit can calculate the position of the vehicle in the lane. These calculations are also carried out in a way known to experts in the field.

The information about the distance from the vehicle to the two lane lines and information about the lane is sent to the apparatus 2. The apparatus 2 comprises a control unit 5 and an image display unit 6. The control unit 5 can either be integrated into a control unit already in the vehicle or it can, as in this example, be a separate unit. The control unit comprises components known to experts in the field, such as processor(s), memory, input circuits and output circuits.

The image display unit 6 consists of a unit that can display graphical images; in this example, a viewing screen. The viewing screen is also used here to display information relevant to the driver, such as speed, engine speed, air pressure and the like. The viewing screen thereby replaces the conventional instrument.

The image display unit 6 is mounted in a suitable position in the driver's cab so that the information can be displayed in the driver's primary field of vision; that is, the driver must be able to take notice of the information without needing to move his head or take his eyes from the road. In addition to being a viewing screen, the image display unit 6 can also be, for example, a head-up display that projects an image onto the windscreen or a laser that draws an image in a suitable place, for example on the dashboard. The control unit 5 is mounted in a suitable place on the vehicle, preferably somewhere in the driver's cab. The camera 3, the control unit 4, the control unit 5 and the image display unit 6 are connected to each other by means of suitable cabling.

The control unit 5 receives information from the control unit 4 about the distance from the vehicle to the lane lines and information about the lane. A predefined driving area is stored in the control unit 5. A driving area is defined as an area within which the vehicle should normally be driven, that is when the vehicle is inside the driving area, the driver is not to be alerted. The driving area can be defined as an area that lies between the lane lines and that starts a predefined distance from the respective lane lines. If the vehicle goes outside the driving area, that is closer to the lane line than the predefined distance, the apparatus is to start to alert the driver. A driving area for a typical heavy overland vehicle (lorry) can, for example, be an area that starts 30 centimeters inside the respective lane line. The driving area can also be defined asymmetrically, for example, the driving area can start 30 centimeters inside the center line and 40 centimeters inside the line at the side of the road.

When the vehicle goes outside the driving area; that is, when the distance to a lane line is less than the predefined distance, the apparatus starts to alert the driver. The driver is alerted by means of a warning mark 7 according to FIGS. 2*a* and 3*a*. The warning mark 7 is displayed in the driver's field of vision. In this example, the warning mark 7 is displayed on the viewing screen 6 by being overlaid on the existing image.

Figure 2A:
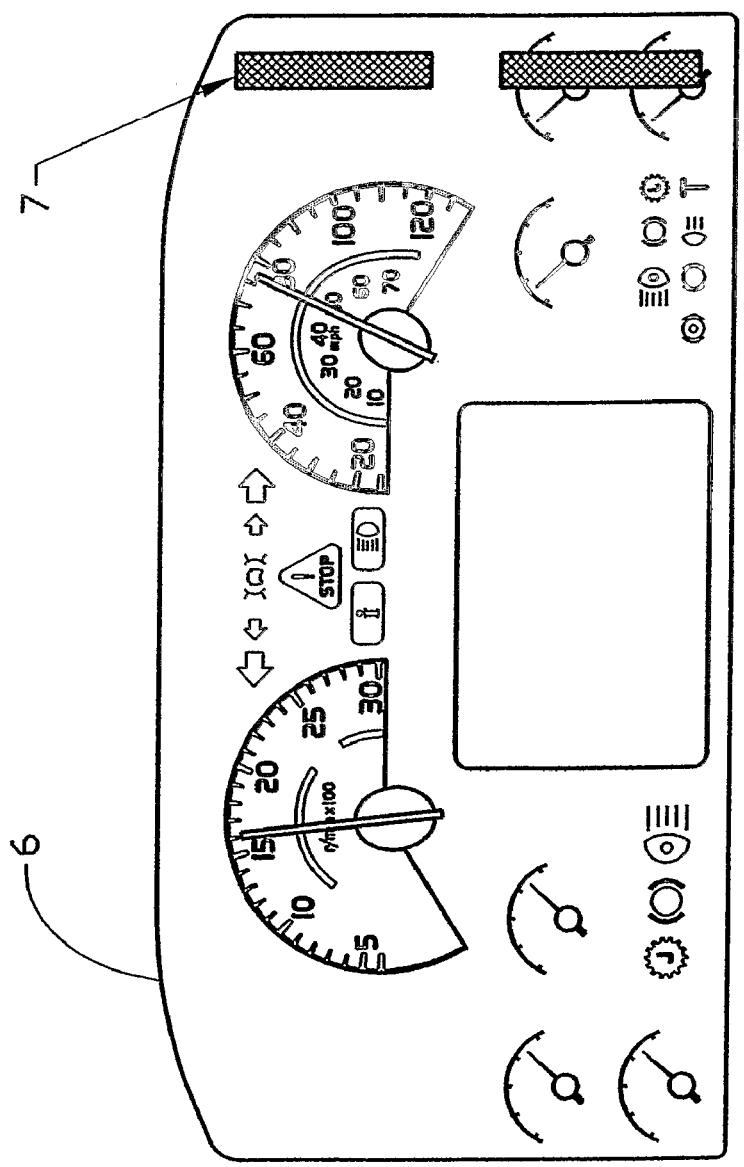
FIGS. 2a and 3a show a first embodiment of an apparatus configured according to the invention.
Figure 3B:
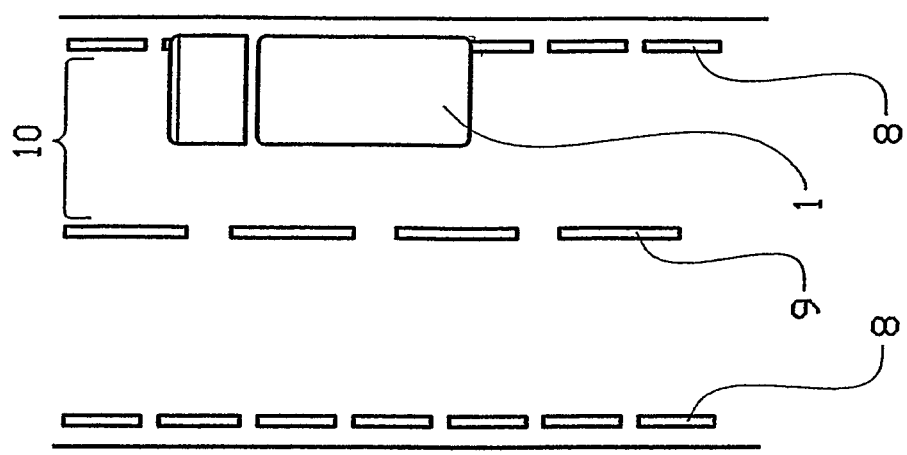
Figure 3A:
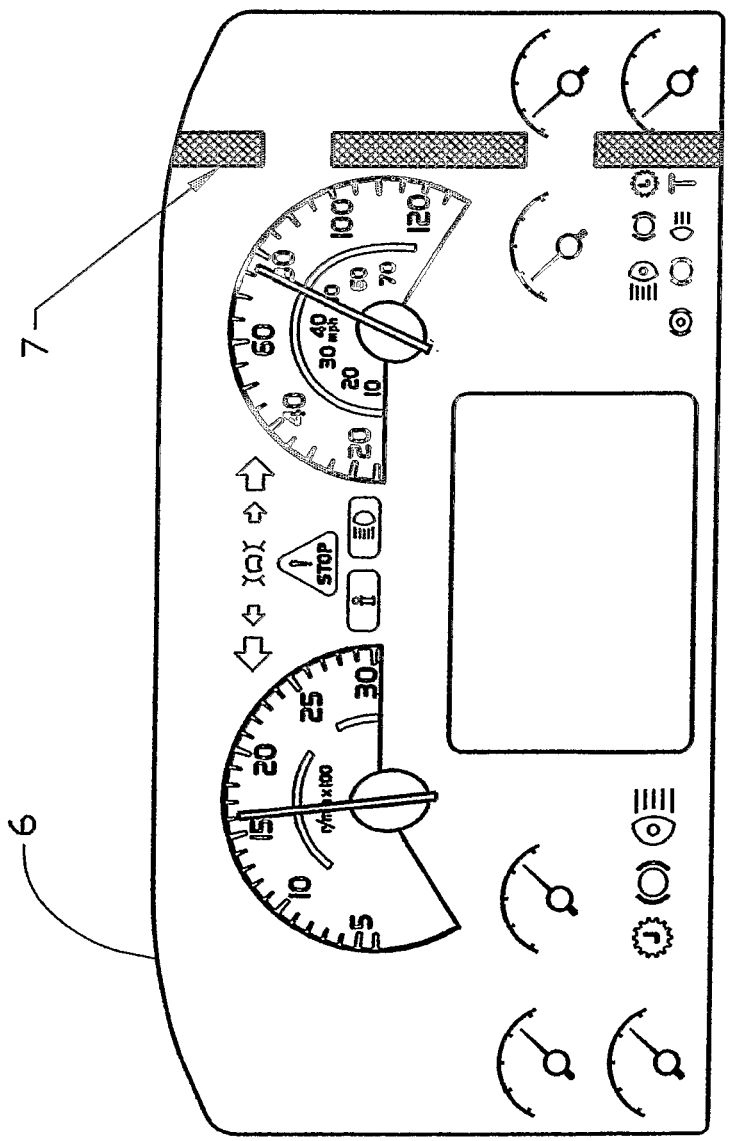

In this example, the warning mark 7 is a broken line of a certain width with each segment having a certain length, as shown in FIGS. 2*a* and 3*a*. The broken line is intended to be reminiscent of a broken line at the side of the road. It is also possible to use a solid line as a warning mark. The warning mark 7 starts to be displayed at the edge of the side of the viewing screen 6 that corresponds to the side of the vehicle where the deviation occurs. In FIGS. 2*a* and 3*a*, examples are shown of a deviation where the vehicle is too close to the line 8 at the side of the road, that is the right lane line for traffic driving on the right. The warning mark 7 starts to be shown at the right-hand edge of the viewing screen 6 (see FIG. 2*a*) when the vehicle is driven outside the driving area 10 (see FIG. 2*b*).

When the deviation increases, that is when the vehicle approaches the line 8 at the side of the road, the warning mark 7 moves toward the center of the viewing screen 6. In FIG. 3*a*, an example is shown of a warning mark 7 that alerts the driver that the vehicle is being driven on the line 8 at the side of the road, as shown in FIG. 3*b*. When the vehicle crosses the line 8 at the side of the road, the warning mark moves even further in toward the center of the screen. When the vehicle crosses the line 8 at the side of the road, this can, in addition, be shown clearly by, for example, the warning mark 7 changing color and/or shape. The distance from the warning mark to the edge of the viewing screen is advantageously proportional to the distance that the vehicle is outside the driving area. In this way, the driver is alerted when he or she drives too close to the line at the side of the road and the driver also receives information about the distance to the line at the side of the road. This can be advantageous when, for some reason, the driver needs to drive close to the side of the road.

In order to visualize the warning mark more clearly, in a further development, the warning mark 7 can also move vertically on the viewing screen 6; that is from the upper edge of the viewing screen to the lower edge of the viewing screen. When the warning mark 7 consists of a broken line, the warning mark will resemble a broken lane line that is moving past on the viewing screen.

The speed of the movement of the warning mark vertically is advantageously proportional to the speed of the vehicle, so that the driver receives an impression of a broken lane line being shown correctly on the viewing screen.

In a second variation or development of the invention, an audible signal is also used to reinforce the warning. Exemplarily, the audible signal can either start to sound at the same time or after the warning mark has begun to be displayed. The audible signal is advantageously heard from the same side of the sound system as the side that the warning mark is shown on the viewing screen. In this example, the audible signal is heard from the right side. The strength of the audible signal starts low and increases as the deviation increases. In this example, the audible signal is a pulsating tone with a pulse frequency that can conform to the vertical movement of the warning mark; that is the frequency of the pulses is proportional to the vehicle's speed. In this way, the driver also receives an audible feedback that is reminiscent of the sound that can arise when a vehicle is being driven on a line at the side of the road. When the vehicle crosses the line at the side of the road, this can be indicated, for example by the frequency of the audible signal being changed to a higher frequency.

In a third variation or development of the invention, a vibration function is also used to reinforce the warning. The vibration advantageously does not start until after the warning mark has started to be displayed, that is when the distance to a lane line is less than the predefined distance. The vibration can advantageously be incorporated into the driver's seat and come from the same side of the seat as the side that the warning mark is shown on the viewing screen. In this example, the right side of the seat vibrates. The intensity of the vibration can be proportional to the size of the deviation. The vibration can also pulsate with a pulse frequency that conforms to the movement of the warning mark vertically, that is the frequency of the pulses is proportional to the speed of the vehicle. It is also possible to have the vibration integrated into the steering wheel instead of into the driver's seat. In this way, the driver also receives a tactile feedback that is reminiscent of the vibrations that can arise when a vehicle is driven on a line at the side of the road. As the apparatus is intended to alert a driver when a vehicle is about to cross a lane line unintentionally, for example when the driver has lost concentration on the road or has fallen asleep, it is advantageous if the apparatus can be disconnected when the driver makes a deliberate lane change.

In a fourth variation or development of the invention, the apparatus is therefore disconnected when an intentional lane change is carried out. The simplest indication that a lane change is intentional is when the driver uses the vehicle's direction indicators. In this example, the apparatus is therefore deactivated when the vehicle's direction indicator is activated. There are also other ways of determining whether a lane change is intentional. For example, the driver's eye movements can be analyzed using a vision system. If, for example, the driver looks frequently in one rear-view mirror, this is a sign that he is planning to change lanes in this direction.

In a fifth variation or development of the invention, the apparatus is activated and/or the parameters of the apparatus are modified when there is a risk that the driver has lost concentration or is tired. This can be carried out by activating the apparatus a certain period of time after the last break for a rest, for example two hours after the vehicle has been started up. The activation of the apparatus can also be carried out at certain times of the day, for example between midnight and 5 in the morning, when a driver runs the greatest risk of falling asleep. Another possibility is to activate the apparatus at the end of the driver's shift, for example during the last two hours of the shift. This is particularly advantageous for long-distance buses, where the drivers' shifts are allowed to be longer than, for example, those of a lorry driver. The apparatus can also be activated when the driver answers the telephone, something that has been found to affect a driver's concentration. When the apparatus is activated all the time, the parameters of the apparatus can be modified so that the driver is alerted earlier and/or the warning is more distinct when the driver has lost concentration or is tired. For example, the driving area can be reduced in size; that is, the permitted distance to a lane line can be increased, or the strength of an audible signal can be increased in the abovementioned cases.

In a sixth variation or development of the invention, the apparatus is activated and/or the parameters of the apparatus are modified when the driver shows signs of being tired or of having lost concentration. In this example, the apparatus is connected to a vision system that analyses whether the driver shows signs of being tired. For example, the driver's rate of blinking and his eye movements provide information about whether the driver is getting tired or is losing concentration. If the driver shows signs of being tired, the apparatus is modified to take this into account. For example, the driving area can be reduced in size; that is, the permitted distance to a lane line can be increased when the driver shows signs of being tired. It is also possible to intensify a warning signal, for example to increase the strength of an audible signal when symptoms of tiredness are shown. Another possibility is not to activate the apparatus until the driver has shown signs of tiredness.

In a seventh variation or development of the invention, the apparatus is connected to a function that acts upon the vehicle's steering. This function can either steer the vehicle actively and/or make the steering stiffer; that is, resist movements of the steering wheel. When the apparatus has detected that the vehicle is about to cross a lane line, a function can start to steer the vehicle back. This function advantageously applies a small force to the steering, so that the driver can continue without a problem when the lane change is intentional. However, if the driver has fallen asleep, the vehicle will not cross the lane line but will keep within the lane line. The accelerator and brake can also be connected to this function, so the vehicle can also be slowed down in a controlled way. This function is advantageously deactivated when the lane change is intentional, for example when the direction indicator is activated.

In an eighth variation or development of the invention, the apparatus is connected to a GPS receiver and a map database, for example in a navigation system. By this means, the apparatus can receive information about the direction in which the vehicle is driving and the type of road upon which the vehicle is driving. This information can be used to modify the driving area and/or the warning signals. For example, when the vehicle is being driven in the right-hand lane on a motorway with two lanes, the apparatus can redefine the driving area so that the driving area is within the line at the right-hand side of the road and the line at the left-hand side of the road. In this way, the driver can change lanes without being alerted when the center line is crossed, provided the vehicle is driven within the driving area; that is, within the two outer lines at the sides of the road. The object of this is to avoid disturbing the driver by alerting them unnecessarily.

In a ninth variation or development of the invention, the apparatus simultaneously displays warning marks on both sides of the viewing screen. This can be advantageous, for example when the vehicle is being driven in an unusually narrow lane, such as near roadworks. In this way, the driver receives assistance in keeping within the lane lines on both sides of the road.

As different drivers have different needs and requirements (depending among other things upon the type of driving and in which country the vehicle is being driven), it is advantageous if the driver can himself set the conditions for the alerting apparatus that best suit a specific driving situation, via the vehicle's menu system. For example, when the vehicle is used for distribution within a built-up area, the driver can switch off the audible signals in order not to be disturbed by constant warning sounds.

It is also possible to deactivate the alerting apparatus completely in certain situations. This deactivation can, for example, be linked to the vehicle's speed or to a geographical area. This means, for example, that the driver is not alerted while the vehicle is being driven below a certain speed, for example 50 km/h. When the deactivation of the apparatus is linked to a geographical area, the driver is not alerted within this area. A vehicle can, for example, pick up goods and then distribute goods within a built-up area, for example in a city. The risk of falling asleep while making deliveries is considerably less than during long-distance driving.

The deactivation of the apparatus can also be linked to various driving situations. Thus, for example, the apparatus can be activated when the vehicle is being driven with a trailer, but deactivated when the trailer is disconnected. This is advantageous when the vehicle is used for long-distance transportation with a trailer and then for distribution without the trailer.

In a preferred embodiment of the method of the invention, when the vehicle deviates from a predefined driving area in a lane, the method comprises the steps of detecting the limits of the lane, of identifying the position of the vehicle in the lane, of comparing the position of the vehicle with the driving area and, when the vehicle is outside the predefined driving area, of giving a visual warning on a viewing screen by means of a warning mark on the side of the viewing screen that corresponds to the vehicle's deviation. The warning mark is in the form of a broken line that is moved sideways in proportion to the size of the deviation. In addition, the warning mark is moved along the vehicle's longitudinal axis in proportion to the vehicle's speed. In this way, the image of the warning mark on the viewing screen will resemble lines that are going past. This warning mark is easy to perceive and gives the driver a good idea of how close the vehicle is to a line.

When the deviation is large, that is when the vehicle is extremely close to or on the line, an audible signal and/or a vibration signal can also be used to reinforce the warning and make it clearer.

In a first embodiment of the method according to the invention, the step is included of deactivating the warning when an intentional lane change is carried out. This can, for example, be carried out by the apparatus being deactivated when the vehicle's indicators are active.

The object of the method according to the invention is to alert the driver in the event of an unintentional lane change, for example, when the driver has lost concentration or has fallen asleep. The apparatus can therefore be deactivated when there is little risk of an unintentional lane change. For example, the apparatus can be deactivated when the vehicle's speed is less than a predefined speed and/or when the vehicle is within a predefined geographical area. It can also be advantageous not to activate the apparatus until there is an increased risk of an unintentional lane change. It can also be advantageous to modify the parameters of the apparatus so that the driver is alerted earlier and/or the warning is intensified when there is an increased risk of an unintentional lane change.

The invention is not be regarded as being limited to the embodiments described above, a number of further variants and modifications being possible within the framework of the patent claims. For example, the apparatus can also be used to alert the driver that vehicles or other road users are within a certain distance of the vehicle.

What is claimed is:

1. An apparatus for a vehicle for alerting a driver of the vehicle when the vehicle deviates from a predefined driving area in a lane, the apparatus comprising:
   an image display unit (6) connected to a control unit (5) that together provide a visual warning (7) on the image display unit (6) when the vehicle is outside the predefined driving area, the visual warning (7) taking the form of one of (i) a solid and (ii) a broken line at the side of the image display unit (6) that corresponds to the side of the vehicle toward which the deviation is occurring;
   wherein the visual warning (7) is moved sideways in proportion to the size of the deviation.

2. The apparatus as recited in claim 1, wherein the visual warning (7) is in proportion to the size of the deviation.

3. The apparatus as recited in claim 1, wherein the visual warning (7) is moved longitudinally in proportion to the speed of the vehicle.

4. The apparatus as recited in claim 1, wherein one of (i) an acoustic signal and (ii) a vibration signal alerts the driver when the vehicle is outside the predefined driving area (10).

5. The apparatus as recited in claim 1, wherein the apparatus is deactivated when an intentional lane change is carried out.

6. The apparatus as recited in claim 1, wherein the apparatus is deactivated when the vehicle's direction indicator is activated.

7. The apparatus as recited in claim 1, wherein the driving area (10) of the apparatus is modified to suit the type of road upon which the vehicle is being driven.

8. The apparatus as recited in claim 7, further comprising a GPS receiver and a map database that enables the driving area (10) to be modified to suit the type of road upon which the vehicle is being driven.

9. The apparatus as recited in claim 1, wherein the apparatus is activated when there is risk that the driver may lose concentration or when the driver has actually lost concentration.

10. The apparatus as recited in claim 1, wherein the parameters of the apparatus are modified when there is risk that the driver may lose concentration or when the driver has actually lost concentration.

11. The apparatus as recited in claim 1, wherein the apparatus is deactivated in the event of an external occurrence, when the vehicle is being driven below a predefined speed and/or when the vehicle is within a predefined geographical area.

12. The apparatus as recited in claim 1, wherein the apparatus acts upon the vehicle's steering mechanism when the vehicle is driven on or close to a lane line.

13. The apparatus as recited in claim 1, wherein the apparatus is installed upon a vehicle.

14. A method for alerting a driver of a vehicle when the vehicle deviates from a predefined driving area in a driving lane, said method comprising:
   detecting the limits of the driving lane and identifying the position of the vehicle in the driving lane;
   comparing the position of the vehicle with the detected driving area; and
   giving a visual warning to the driver when the vehicle is outside the predefined driving area, via an image display unit, by means of a warning mark in the form of a solid or broken line on the side of the image display unit that corresponds to the side of the vehicle where the deviation occurs;
   wherein the position of the warning mark is proportional to the distance of the vehicle from the edge of the driving lane.

15. The method as recited in claim 14, wherein the warning mark moves along the longitudinal axis of the vehicle in proportion to the vehicle's speed.

16. The method as recited in claim 14, wherein the visual warning is deactivated when the vehicle's indicators are active.

17. The method as recited in claim 14, wherein the visual warning is deactivated when the vehicle's speed is less than a predefined speed and/or the vehicle is within a predefined geographical area.

18. The method as recited in claim 14, wherein an audible signal alerts the driver when the vehicle is outside the predefined driving area.

19. The method as recited in claim 14, wherein a vibration signal alerts the driver when the vehicle is outside the predefined driving area.

20. The method as recited in claim 14, wherein the apparatus is activated in the event of a predefined occurrence.

21. The method as recited in claim 14, wherein the parameters of the apparatus are modified in the event of a predefined occurrence.

22. The method as recited in claim 14, wherein the driving area of the apparatus is modified to suit the type of road on which the vehicle is being driven.

23. A computer program product comprising program code, stored on a medium that can be read by computer, for carrying out the recited steps of claim 14 when said program is executed by a computer.

* * * * *

UNITED STATES PATENT AND TRADEMARK OFFICE
CERTIFICATE OF CORRECTION

| | |
|---|---|
| PATENT NO. | : 7,411,485 B2 |
| APPLICATION NO. | : 11/163005 |
| DATED | : August 12, 2008 |
| INVENTOR(S) | : Johan Jarlengrip |

Page 1 of 1

It is certified that error appears in the above-identified patent and that said Letters Patent is hereby corrected as shown below:

Title page, item [54] and col. 1, please correct "ALTERING" to --ALERTING-- at line (54), to read as follows:

--(54) APPARATUS AND METHOD FOR ALERTING A DRIVER WHEN A VEHICLE DEPARTS FROM A PREDEFINED DRIVING AREA IN A LANE--

Signed and Sealed this

Seventh Day of October, 2008

JON W. DUDAS
*Director of the United States Patent and Trademark Office*